Dec. 26, 1961     C W. MUSSER ET AL     3,014,368
EXTERNAL MEANS OF MEASURING PRESSURE IN GUNS
Filed July 3, 1957
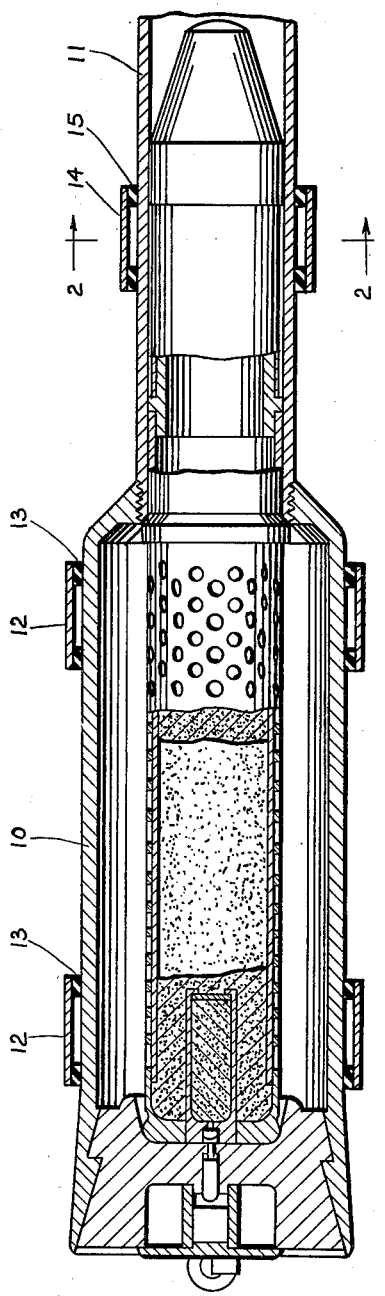
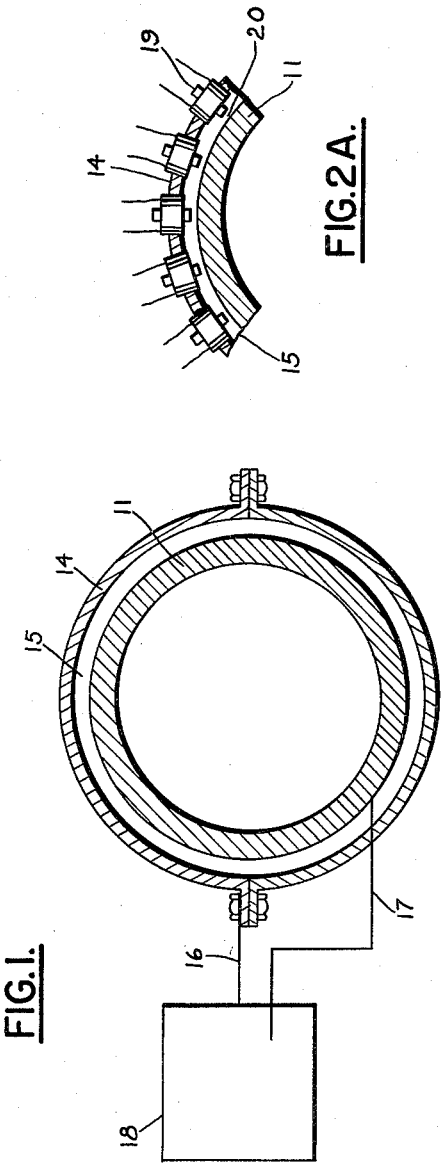
INVENTORS,
RANDAL H. THOMAS
C WALTON MUSSER
BY

United States Patent Office 3,014,368
Patented Dec. 26, 1961

3,014,368
EXTERNAL MEANS OF MEASURING PRESSURE IN GUNS
C Walton Musser, Beverly, Mass., and Randal H. Thomas, Philadelphia, Pa., assignors to the United States of America as represented by the Secretary of the Army
Filed July 3, 1957, Ser. No. 669,901
1 Claim. (Cl. 73—167)
(Granted under Title 35, U.S. Code (1952), sec. 266)

The invention described herein may be manufactured and used by or for the Government for governmental purposes without the payment of any royalty thereon.

This invention involves a measurement of ballistic pressures within thin wall guns without defacing the surface of the gun or drilling a hole for access to the pressure chamber. The apparatus can be applied instantly to any stock rifle and can be employed at one or several locations simultaneously along the breech and barrel.

There are a number of ways used to measure ballistic pressures within rifles. Two of these methods involve mounting on the breech or barrel one or more housings containing pressure-sensitive cylinders. The devices are mounted by means of threaded fittings which screw into the pressure chamber through holes which must be provided for pressure measurements. The ballistic pressure reaches the cylinder within the gage through an orifice in the fitting communicating with the chamber. The cylinders may be either metal slugs which deform permanently as a result of the applied pressure or may be piezoelectric crystals which develop an electrical charge when subjected to mechanical stresses. The difficulty involved with applying such pressure measuring techniques to thin wall rifles arises from the fact that the thickness both of the chamber and of the barrel is insufficient to receive the threaded fittings unless the particular rifle under investigation is built with special bosses to accommodate the threaded fittings. Quite naturally this eliminates the possibility of employing these techniques to production models of recoilless or other thin walled rifles and of measuring pressures within the specially prepared models at points other than those specified when the gun is built.

Another method of measuring ballistic pressure more suitable for thin wall weapons is by using electrical strain gages to determine the transient deformation of the barrel or breech due to the pressure within. The technique involves adhesively attaching small electrical gages to the surface of the gun and measuring the change in electrical resistance of the wires within the gages due to the expansion of the surface to which they are bonded. Although this method yields reliable information about the surface expansion in the particular point where the gage has been cemented on, since the most convenient type of strain gage covers an area less than one-quarter of an inch square, several of these gages have to be mounted around a given location in order to obtain measurement expansion independent of local strains which develop due either to non-uniformity of barrel fabrication or the lack of axial symmetry of the rifle. A further decided drawback in the use of the strain gage pressure measuring technique arises from the fact that the gages must be mounted at least 24 hours before use in order that an adequate bond to the surface of the gun may be established. This makes the method inconvenient for application to production testing of rifles and because the gages are relatively fragile, may cause a considerable delay in the testing program should one or more of the gages be damaged during handling of the weapon.

According to this invention, an apparatus for determining barrel expansion as a measure of ballistic pressure is provided which overcomes the objections cited for the other methods. Specifically, this invention provides a technique which is simple and immediately applicable to any weapon without defacing or altering the structure or surface of the gun in any way. The apparatus involves mounting a metal ring or sleeve around the barrel at the point where the pressure determination is desired and measuring electrically the change in spacing between the barrel and the concentric sleeve. The sleeve may be spaced from the barrel by means of compressible insulating rings soft enough that the barrel expansion does not create significant stresses in the surrounding sleeve. In fact the sleeve may be annularly spaced from the barrel by any appropriate deformable insulating means. Actually, the change in spacing can be measured by any dynamic inductance having a response time less than 1/10 milli-second or a capacitance measurement. In the former technique, a number of coils are mounted radially in the sleeve about the barrel so that the expansion of the barrel will decrease the air gaps between the metal barrel and the ends of the cores on which the coils are wound. Any circuitry capable of measuring small inductance changes at rapid rates is suitable. The latter technique involves employing the metal sleeve as one plate of a cylindrical condenser of which the barrel itself forms the inner part. Any of a variety of electrical techniques can be employed to measure the capacitance change resulting from the decrease in spacing between sleeve and barrel due to the barrel expansion.

FIG. 1 is a cross-sectional view displaying one embodiment of this invention applied to a recoilless gun of conventional type.

FIGS. 2 and 2a are sections on the line 2—2 of FIG. 1.

Referring to the drawing, FIG. 1, the numeral 10 is the designation of the chamber of the thin wall recoilless rifle while the section of changed diameter 11 represents a portion of the barrel. Numerals 12 and 14 of the drawing represent the concentric sleeves applied to the weapon for the expansion in pressure measurement while numerals 13 and 15 represent the compressible rings supporting the sleeves.

FIG. 2 shows the sleeve as it is used in the capacitance measurement, where it is necessary only to affix an electrical conductor 16 in the form of a wire to the sleeve, as well as a second conductor 17 attached anywhere on the weapon itself, to execute the measurement by any convenient well known means 18.

FIG. 2 shows in detail the assembly required to determine barrel expansion by an electrical inductance measurement. Numeral 19 of this figure represents radially mounted coils on and in a ring 14 while 20 represents the air gap between the magnetic cores of the coils and the surface of the gun barrel 11. Actually, the change in spacing can be measured by any dynamic inductance or capacitance measurement having a response time less than 1/10 millisecond.

In both embodiments of the invention, the sleeve may be fabricated in one section, or in two or more sections which may be bolted together, depending on what is required for ease of applying the technique to the particular weapon involved.

Once again the advantage of this apparatus may be stated as the simplicity and rapidity with which the measurement may be applied to any thin wall weapon at any location without requiring any alteration of the weapon itself. The thin wall referred to is a radial wall thickness of the order of one-eighth the radius of the bore of the gun.

We claim:

In an apparatus for measuring the pressure generated on firing a propellant and projectile within a recoilless gun having thinner and more expansible walls than do the recoiling type guns of the same caliber and muzzle velocity, the combination therewith of the improvement whereby such guns may be tested rapidly without disfigurement from drilling a hole through a side wall of the gun and without delays incident to hardening an adhesive used in attaching strain gauges to a gun barrel, and without delays entailed by precalibrating resistance elements of strain gauges, the combination therewith of the improvement comprising an electrically conductive ring encircling at least a portion of said gun and radially spaced therefrom, an expansion absorbing and electrically insulating spacing support between said gun and ring for supporting said ring in said encircling position, said support absorbing substantially all expansion by said gun to preclude said ring from being stressed in tension an amount to reduce the accuracy of a pressure measurement, and means electrically connected between said ring and gun for indicating an impedance component variation produced by a change in the spacing between said ring and gun due to expansion of the walls of said gun on firing it, whereby substantial time may be saved on proof-firing such a gun.

References Cited in the file of this patent

UNITED STATES PATENTS

| | | |
|---|---|---|
| 1,939,067 | Legg | Dec. 12, 1933 |
| 2,320,881 | Newton | June 1, 1943 |
| 2,361,173 | Browne | Oct. 24, 1944 |
| 2,879,450 | Baker | Mar. 24, 1959 |

FOREIGN PATENTS

| | | |
|---|---|---|
| 203,727 | Germany | Oct. 7, 1908 |
| 549,140 | Great Britain | Nov. 9, 1942 |